(No Model.)
J. D. MATTISON.
ROLLER BEARING.
No. 567,150. Patented Sept. 8, 1896.
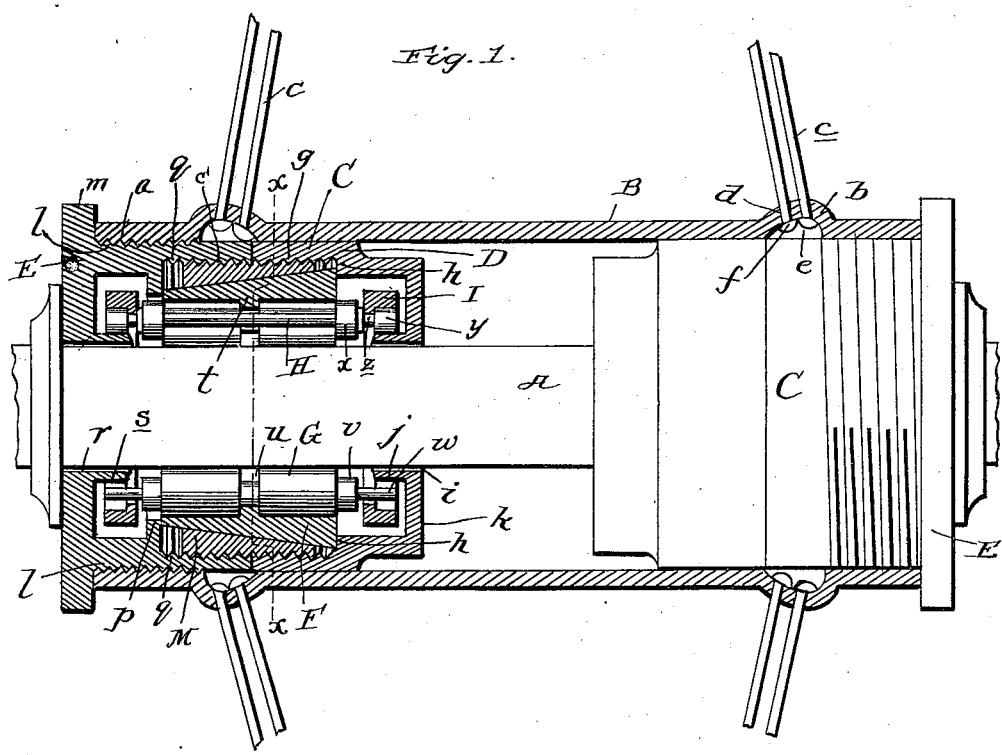
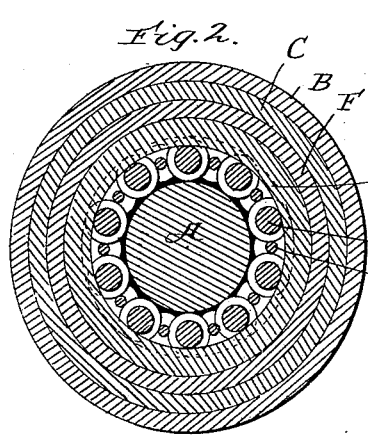
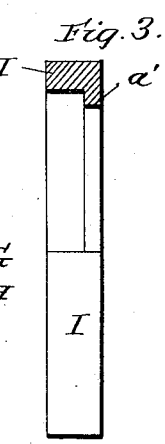
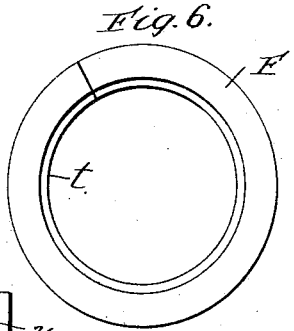
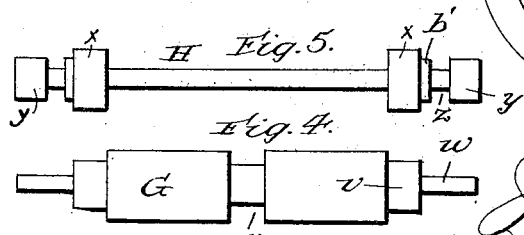
Witnesses:
C. H. Raeder
W. A. James
Inventor
J. D. Mattison
By James J. Sheehy
Attorney

UNITED STATES PATENT OFFICE.

JAMES D. MATTISON, OF SAGINAW, MICHIGAN.

ROLLER-BEARING.

SPECIFICATION forming part of Letters Patent No. 567,150, dated September 8, 1896.

Application filed January 23, 1896. Serial No. 576,570. (No model.)

*To all whom it may concern:*

Be it known that I, JAMES D. MATTISON, a citizen of the United States, residing at Saginaw, E. S., in the county of Saginaw and State of Michigan, have invented certain new and useful Improvements in Roller-Bearings; and I do declare the following to be a full, clear, and exact description of the invention, such as will enable others skilled in the art to which it appertains to make and use the same.

My invention relates to improvements in antifriction roller-bearings designed more particularly for use in conjunction with bicycle and other wheels; and its novelty and many advantages will be fully understood from the following description and claims, when taken in conjunction with the annexed drawings, in which—

Figure 1 is a view, partly in section and partly in elevation, of a portion of a wheel embodying my invention, the same being shown in position upon its axle. Fig. 2 is a transverse section taken in the plane indicated by the line $x$ $x$ of Fig. 1. Fig. 3 is an edge elevation, partly in section, of one of the movable rings. Fig. 4 is an enlarged elevation of one of the main bearing-rollers. Fig. 5 is a similar view of one of the intermediate rollers, and Fig. 6 is an end elevation of one of the housing-rings.

Referring by letter to the said drawings, A indicates a shaft or axle which may be that of a bicycle or other wheel, and B indicates the hub or box of the wheel. This hub or box which surrounds the shaft or axle A is provided at or adjacent to its opposite ends with interior threads $a$, and at intermediate points of its length adjacent to its ends it is provided with the annular enlargements $b$, which are designed to permit of the connection of the spokes $c$ in such a manner that they will not interfere with the introduction of the shells (presently described) into the hub or box. The spokes $c$, which may be of any suitable type, are, as better shown in Fig. 1, passed through apertures $d$ in the enlarged portions $b$ of the hub or box, and they are secured in the recesses $e$, formed by the said enlarged portions $b$, by forming the enlargements $f$ upon their inner ends or by any other suitable means.

C indicates the shells of the roller-bearings, of which two are employed, one at each end of the hub or box B. These shells may be of any construction suitable to the purposes of my invention; but I prefer to have them respectively comprise an inner section D, which fits snugly within the hub or box B and has the interior threads $g$, the interior shoulder $h$ at the inner end of the threads $g$, the central aperture $i$, receiving the axle A, the inwardly-extending flange $j$, surrounding the axle A, and the inner end $k$, which is preferably of angular form for the application of a wrench or the like for a purpose presently described, and the outer section E, which is designed to abut at its inner end against the end of shell C and has the exterior threads $l$, which engage the threads $a$ of the hub, the interior threads $q$, the flange $m$, which bears against the end of the hub, the inwardly-extending diametrically-disposed flange $p$, the aperture $r$, which receives the axle A, and the longitudinally-disposed flange $s$, which surrounds the axle A, as shown.

F indicates split housing-rings, of which one is employed in each shell or casing C. These housing-rings abut at their ends against the shoulders $h$ and flanges $p$ of the shell-sections D E, as shown, and they have their outer sides tapered from their inner to their outer ends for a purpose presently described and are provided in their inner sides with the ribs $t$, the latter being designed to take into the peripheral grooves $u$ in the main bearing-rollers G, as illustrated, so as to hold said rollers against endwise movement. The said main bearing-rollers are interposed between and bear against the housing-rings F and the axle A, and they are provided adjacent to their ends with the reduced portions $v$ and the bosses $w$, the purpose of which will be presently disclosed.

Intermediate of the main bearing-rollers G are arranged the rollers H, the purpose of which is to hold the rollers G the proper distance apart and to further assist said rollers G in reducing the friction to a minimum. These intermediate rollers H are reduced in diameter for the greater part of their length, and they are provided adjacent to their opposite ends with the enlarged portions $x$, which bear against the reduced portions $v$ of the rollers G, and are further provided with end portions $y$, which bear upon the flanges $j\ s$ of the shell-sections D E, and with the grooves $z$ to receive the inwardly-extending flanges $a'$ of the movable or revoluble rings I, and the reduced portions $b'$, which bear against the inner sides of the said rings, as illustrated. The said rings I serve to hold the intermediate rollers H in their proper relative positions, and through the medium of said rollers H said rings I also serve to hold the main bearing-rollers G in their proper relative position. It will be further seen that while the bosses $w$ of the rollers G do not in operation engage the rings I or the flanges $j\ s$, yet they extend to points between the rings and the flanges $j\ s$, and consequently are enabled to serve the important function of preventing the rollers G from dropping out of place when the wheel is removed from the axle.

M indicates what may properly be termed a "wedge-ring," of which one is employed in each shell C. These wedge-rings M have their inner sides tapered in conformity to the exterior sides of the housing-rings F, and they also have exterior threads $c'$, which are designed to engage the interior threads $g\ q$ of the shell-sections D E, respectively, as illustrated.

It will be readily observed from the foregoing description, taken in conjunction with the drawings, that inasmuch as the projections $h\ p$ of the shell-sections abut against the ends of the housing-rings F and the said housing-rings have ribs $t$, which enter grooves $u$ in the bearing-rollers, the said rollers and also the intermediate rollers, which are engaged thereby, will be held in their proper relative positions in the shells and will be effectually prevented from moving endwise therein and engaging the ends thereof. It will also be observed that by moving the taper or wedge rings M inwardly the housing-ring F may be crowded upon the main rollers G without moving said housing-ring longitudinally, and any slight frictional wear that may ensue from use may be taken up. The movement of the said taper-rings in either direction to crowd or to enable the housing-rings to expand may be effected by turning the shell-sections D E, and may be accomplished, as above stated, without changing the position of the housing-ring or the rollers G H with respect to the shells. It will be further observed that the shells C may be easily placed in and removed from the hub or box B and that the angular ends of the shells, to which a wrench is applied in adjusting or disconnecting the sections thereof, are within the hub or box, and are consequently not likely to be tampered with by meddlesome persons.

It will be seen that notwithstanding its many advantages my improved bearing is very cheap and simple and is adapted to be quickly and easily taken apart and put together and may therefore be easily repaired.

Having described my invention, what I claim is—

1. In a roller-bearing, the combination of a shaft or axle, a shell or casing receiving the shaft or axle and having flanges surrounding the same, main bearing-rollers bearing against the shaft or axle and having the reduced portions adjacent to their ends and the bosses at their ends, rollers arranged intermediate of the main bearing-rollers and having the reduced intermediate portions and the enlarged portions adjacent to their ends, the latter engaging the reduced portions adjacent to the ends of the main bearing-rollers and also having end portions bearing on the flanges at the ends of the shell or casing, movable rings surrounding and engaging the intermediate rollers and also surrounding the bosses of the main bearing-rollers, and a suitable housing interposed between the main bearing-rollers and the shell or casing; the said housing being adapted to prevent endwise movement of said main bearing-rollers, substantially as and for the purpose set forth.

2. In a roller-bearing, the combination of a shaft or axle, a shell or casing receiving the shaft or axle and comprising two sections having interior threads and also having interior projections, rollers arranged within the shell or casing, a tapered housing-ring surrounding the rollers and adapted to hold said rollers against endwise movement and abutting at its ends against the interior projections of the shell-sections, and the wedge or taper ring surrounding the housing-ring and having exterior threads engaging the interior threads of the shell or casing sections, substantially as and for the purpose specified.

3. In a roller-bearing, the combination of a shaft or axle, a shell or casing receiving the shaft or axle and comprising two connected sections having interior projections, bearing-rollers engaging the shaft or axle, rollers intermediate of the said bearing-rollers and bearing on the shell-sections, a tapered housing-ring surrounding the bearing-rollers and adapted to hold said rollers against endwise movement and abutting at its ends against the interior projections, and the wedge or taper ring surrounding the housing-ring and having exterior threads engaging interior threads in the shell or casing sections, substantially as and for the purpose specified.

4. In a roller-bearing, the combination of an axle or shaft, and a wheel comprising a hub or box surrounding the axle and provided with interior threads, shells or casings fitting snugly within the hub or box at opposite ends thereof and having exterior threads engaging the interior threads of said hub or box; the said shells or casings respectively consisting of two sections having interior threads and also having interior projections, main bearing-rollers engaging the shaft or axle, a tapered housing-ring surrounding the bearing-rollers and adapted to hold said rollers against endwise movement and abutting at its ends against the interior projections of the shell-sections and the wedge or taper ring surrounding the housing-ring and having exterior threads engaging the interior threads of the shell or casing sections, substantially as and for the purpose set forth.

5. A roller-bearing comprising main rollers having reduced portions adjacent to their ends and also having bosses extending beyond said reduced portions, and intermediate rollers engaging the reduced portions of the main rollers; the bosses of the main rollers being adapted to turn without engaging any of the parts of the bearing, substantially as and for the purpose specified.

6. A roller-bearing comprising main rollers having reduced portions adjacent to their ends and also having bosses extending beyond said reduced portions, intermediate rollers engaging the reduced portions of the main rollers, and rings surrounding and engaging the intermediate rollers and also surrounding but not engaging the bosses of the main bearing-rollers, substantially as and for the purpose set forth.

In testimony whereof I affix my signature in presence of two witnesses.

JAMES D. MATTISON.

Witnesses:
D. W. LE VALLEY,
F. W. BUNITT.